United States Patent
Aoki

(10) Patent No.: US 9,079,457 B2
(45) Date of Patent: Jul. 14, 2015

(54) PNEUMATIC RADIAL TIRE FOR HEAVY LOAD HAVING LUG GROOVES

(75) Inventor: Yasutoshi Aoki, Higashiyamato (JP)

(73) Assignee: BRIDGESTONE CORPORATION, Tokyo (JP)

(*) Notice: Subject to any disclaimer, the term of this patent is extended or adjusted under 35 U.S.C. 154(b) by 765 days.

(21) Appl. No.: 12/867,187

(22) PCT Filed: Feb. 10, 2009

(86) PCT No.: PCT/JP2009/052213
§ 371 (c)(1),
(2), (4) Date: Oct. 12, 2010

(87) PCT Pub. No.: WO2009/101931
PCT Pub. Date: Aug. 20, 2009

(65) Prior Publication Data
US 2011/0017375 A1    Jan. 27, 2011

(30) Foreign Application Priority Data

Feb. 12, 2008  (JP) ................................. 2008-030815

(51) Int. Cl.
*B60C 11/13*  (2006.01)
*B60C 11/03*  (2006.01)

(52) U.S. Cl.
CPC ......... *B60C 11/0316* (2013.04); *B60C 11/1323* (2013.04); *B60C 2011/0313* (2013.04); *B60C 2011/0383* (2013.04)

(58) Field of Classification Search
CPC .................................................. B60C 11/1323
USPC ....................................... 152/209.13, 209.24
See application file for complete search history.

(56) References Cited

U.S. PATENT DOCUMENTS

2003/0019555 A1* 1/2003 Nakagawa ............... 152/209.18

2004/0211502 A1* 10/2004 Ono .......................... 152/209.19

(Continued)

FOREIGN PATENT DOCUMENTS

| JP | 3-38410 A | 2/1991 |
| JP | 5-229312 A | 9/1993 |

(Continued)

OTHER PUBLICATIONS machine translation for Japan 2002-240512 (no date).*

(Continued)

*Primary Examiner* — Steven D Maki
(74) *Attorney, Agent, or Firm* — Sughrue Mion, PLLC

(57) ABSTRACT

The present invention provides a pneumatic radial tire for heavy load, having lug grooves in respective side regions of a tread surface, in which tire an amount of slip of the trailing edge of each of land portions defined by the lug grooves, with respect to a road surface, when the tire is rotated with load applied thereon is advantageously reduced without causing decrease in partial wear resistance of the land portions at a road contact surface thereof and generating cracks at the lug groove bottom. The pneumatic radial tire for heavy load, having a plurality of lug grooves 2 provided in respective side regions of a tread surface 1 to extend in the tread width direction, open at respective side edges of the tread surface 1, and define land portions 3 therebetween, is characterized in that: in a cross section of each lug groove 2 in the width direction thereof, only a groove wall 4 on the step-in side of each land portion 3 is bent at at least one bent point in the depth direction of the corresponding lug groove 2 such that a portion 4a of the groove wall, located on the inner side in the radial direction than the bent point f, is tilted in a direction that narrows a groove width.

1 Claim, 3 Drawing Sheets

(56) References Cited

U.S. PATENT DOCUMENTS

2006/0037684 A1* 2/2006 Vervaet .................. 152/209.24
2008/0041509 A1   2/2008 Shimizu

FOREIGN PATENT DOCUMENTS

| JP | 2001-187520 | A |   | 7/2001 |
| JP | 2002-240512 | A | * | 8/2002 |
| JP | 2002-240512 | A |   | 8/2002 |
| JP | 2006-213175 | A |   | 8/2006 |
| JP | 2009-018617 | A |   | 1/2009 |

OTHER PUBLICATIONS

Chinese Office Action issued in Chinese Application No. 200980109368.9 dated Jul. 11, 2013.

Chinese Office Action, dated Nov. 5, 2012, issued in corresponding Chinese Application No. 200980109368.9.

Extended European Search Report issued in European Application No. 09709563.2 dated Dec. 5, 2013.

Chinese Office Action issued in Chinese Application No. 200980109368.9 dated Dec. 11, 2013.

Chinese Office Action, dated Apr. 29, 2014, issued in corresponding Chinese Patent Application No. 200980109368.9.

Chinese Office Action, dated Oct. 20, 2014, issued in corresponding Chinese Patent Application No. 200980109368.9.

Communication dated Apr. 17, 2015 from the State Intellectual Property Office of the People's Republic of China in counterpart application No. 200980109368.9.

* cited by examiner

US 9,079,457 B2

PNEUMATIC RADIAL TIRE FOR HEAVY LOAD HAVING LUG GROOVES

TECHNICAL FIELD

The present invention relates to a pneumatic radial tire for heavy load whose rotational direction is specified, and, in particular, to a pneumatic radial tire possessing improved partial wear resistance at land portions defined by lug grooves in respective side regions of a tread surface thereof.

BACKGROUND ART

In a pneumatic radial tire for heavy load for use in a vehicle such as a construction vehicle adapted to traveling on unpaved roads, there has been widely used a tread pattern having lug grooves in side regions of a tread surface thereof.

Conventionally, a tire of this type is generally designed such that, in a cross section of a lug groove in the width direction thereof, an angle formed by a groove wall on the step-in side of a land portion, with respect to a line normal to a surface of the land portion, is substantially equal to an angle formed by a groove wall on the kick-out side of the land portion, with respect to a line normal to the surface of the land portion. With this design, upon rotation of a tire, when the leading edge 31 of one land portion is in contact with the ground and the trailing edge 32 of another land portion provided adjacent to the one land portion with a lug groove 33 therebetween is still in contact with the ground, as shown in FIG. 5, slippage occurs between the trailing edge 32 of another land portion and the ground as the trailing edge 32 is released from a road surface, whereby uneven wear is quite often generated such that the tailing edge 32 of the another land portion is worn more quickly than the leading edge 31 of the one land portion.

Specifically, the aforementioned slippage is caused by the facts that: when a leading edge 31 of one land portion is brought into contact with a road surface, tread rubber of the leading edge 31 receives a pushing-up force acting on the inner side in the radial direction, whereby a belt section located on the inner side in the radial direction of the leading edge 31 is pressed and deformed on the inner side in the radial direction; due to this deformation of the belt section located on the inner side in the radial direction of the leading edge 31, a belt section of a trailing edge 32 of another land portion separated by a lug groove 33 is deformed toward the outer side in the radial direction by a pressing counterforce O, and this counterforce O elastically deforms a groove wall 35 on the trailing edge side of the another land portion in a direction that narrows a width of the groove; accordingly, as the trailing edge 32 of the land portion leaves the road surface, the trailing edge 32, which has been biased to return to the original shape, makes relatively large slip with respect to the road surface.

In view of the facts described above, there has been proposed a pneumatic radial tire for heavy load, designed such that: in a lateral cross section of a lug groove, a groove wall on a step-in side of one land portion is linearly tilted by a larger angle with respect to a line normal to a surface of the one land portion than a groove wall on a kick-out side of another adjacent land portion is; due to this, some of a pushing-up force acting on the inner side in a radial direction of the one land portion when the leading edge of the one land portion is brought into contact with a road surface is converted into a deformation force acting in a direction widening a width of a lug groove between the land portions; and, as a result, a pressing force acting on the belt section is reduced accordingly, whereby occurrence of partial wear of the trailing edge of the another land portion at an early stage is prevented.

However, in this tire, in a case where the groove width at the bottom of the lug groove is left unchanged, the groove width at a tread surface, of the lug groove, relatively increases and thus the amount of rubber of the land portion relatively decreases, possibly deteriorating wear resistance at the tread surface of the land portion. On the other hand, in a case where the groove width of the lug groove at the tread surface is left unchanged and rather a width of the groove bottom of the lug groove is made small, strains are concentrated at the groove bottom when the tire is rotated, possibly leading to generation of cracks at the groove bottom.

DISCLOSURE OF THE INVENTION

Problems to be Solved by the Invention

In view of the circumstances above, an object of the present invention is to provide a pneumatic radial tire for heavy load, having lug grooves in respective side regions of a tread surface, in which tire an amount of slip with respect to a road surface, of the trailing edge of each of land portions defined by the lug grooves, when the tire is rotated with load applied thereon is advantageously reduced without causing decrease in partial wear resistance of the land portions at a road contact surface thereof and generating cracks at the lug groove bottom.

Means for Solving the Problems

In the present invention, a pneumatic radial tire for heavy load, having a plurality of lug grooves provided in respective side regions of a tread surface to extend in the tread width direction, open at respective side edges of the tread surface, and define land portions therebetween, characterized in that, in a cross section of each lug groove in the width direction thereof, only a groove wall on the step-in side of each land portion is bent at at least one bent point in the depth direction of the corresponding lug groove such that a portion of the groove wall, located on the inner side in the radial direction than the bent point, is tilted in a direction that narrows a groove width.

The term "a cross section of each lug groove in the width direction thereof" as used in the present invention represents a cross section perpendicular to an extending center line $m_1$ of each lug groove.

In land portions demarcated by lug grooves, of a pneumatic radial tire for heavy load whose rotational direction is specified, a "step-in side" of each of the land portions separated by the lug grooves represents a side of each land portion which is first brought into contact with a road surface when the tire is rotated, and a "kick-out side" of each land portion represents a side thereof that is lastly released from the road surface when the tire is rotated.

In such a tire as described above, it is preferable that: the bent point, which may be provided at plural positions, is positioned within the range of 30-70% of a groove depth of the lug groove measured from a surface of the land portion; a portion located on the outer side in the radial direction than the bent point is tilted at an angle "a" with respect to a line normal to the surface of the land portion, which angle "a" falls in the range of 0-20°; a portion located on the inner side in the radial direction than the bent point is tilted at an angle "c" with respect to an imaginary line extended from the radially-outer-side portion, which angle "c" falls in a range of 5-15°; and, a groove wall of the kick-out side of each land portion is tilted such that an angle "b" formed by the groove wall with respect to a line normal to the surface of the land portion satisfies a relationship of a−5°≤b≤a+5° (b≥0°).

In the present invention, the term "angle formed by a portion of a tire with respect to a normal line" represents a tilting angle formed by a tangent line to the portion with respect to a line normal to a land portion in a state where a tire is assembled with an applicable rim, inflated at a specified internal pressure with no load applied thereon. An "applicable rim" refers to a rim specified under industrial standards effective in a region where the tire is manufactured and used, and these industrial standards include ATMA (The Japan Automobile Tyre Manufacturers Association, Inc.) YEAR BOOK in Japan, ETRTO (European Tyre and Rim Technical Organisation) STANDARD MANUAL in Europe, and TRA (THE TIRE and RIM ASSOCIATION INC.) YEAR BOOK in the United States.

A "specified internal pressure" refers to a pneumatic pressure corresponding to a maximum load capability specified for each tire size in the standards like TRA.

Effects of the Invention

As described above, in the case of the conventional tire, when the leading edge of one land portion is in contact with the ground and the trailing edge of another land portion provided on the front side in the rotational direction is still in contact with the ground upon rotation of a tire with load applied thereon, slippage occurs between the trailing edge of another land portion and the ground as the trailing edge is released from a road surface, whereby uneven wear is generated such that the tailing edge of the another land portion is worn more quickly than the leading edge of the one land portion.

In view of this, in the pneumatic radial tire for heavy load according to the present invention, only a groove wall on the step-in side of one land portion is bent at at least one point in the depth direction of a lug groove and a portion located on the inner side in the radial direction than the bent point is tilted in a direction that narrows a lug width in a lateral cross section of the lug groove, whereby the groove wall on the step-in side of the one land portion and a groove wall on a kick-out side of another land portion are made asymmetrical with respect to a center line $m_2$ drawn based on a groove bottom, in the lateral cross section of the lug groove as shown in FIG. 2. As a result, as shown in FIG. 4, it is possible, when the tire is rotated with load thereon, to convert some of pushing-up force acting inwardly in a radial direction of the one land portion due to the leading edge of the one land portion being in contact with the ground, into a deformation force P acting on the one land portion in a direction that reduces a bending angle at the bent point of the groove wall, such that pressing force I acting on a belt section is reduced accordingly, whereby pressing counterforce O acting on a belt section corresponding to the trailing edge of the adjacent another land portion is significantly reduced and thus deformation force Q acting on the groove wall of the trailing edge of the adjacent another land portion in a direction that narrows the groove width is significantly reduced, as well. Accordingly, slippage of the trailing edge of the another land portion relative to the road surface is reduced, whereby the wear of the trailing edge occurring at a relatively early stage can be effectively suppressed.

Figure 1:
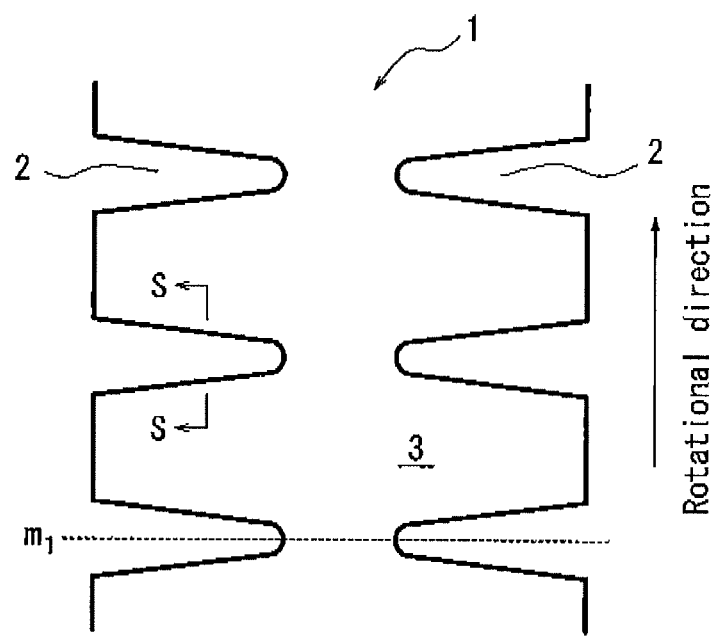
FIG. 1 is a partial development view of a tread pattern showing an embodiment of a pneumatic radial tire for heavy load according to the present invention.

EXPLANATION OF REFERENCE NUMERALS 1, 11 Tread surface
2, 12, 33 Lug groove
3 Land portion
4 Groove wall on step-in side
4a Portion on the inner side in radial direction
4b Portion on the outer side in radial direction
5, 35 Groove wall on kick-out side
16 Circumferential groove
17 Center land portion
18 Shoulder land portion
19 Lateral groove
20 Center block
21 Shoulder block
22 Sub-Groove
31 Leading edge
32 Trailing edge

BEST MODE FOR CARRYING OUT THE INVENTION

With reference to the drawings, a pneumatic radial tire for heavy load according to the present invention will be described in detail hereinbelow. FIG. 1 is a partial development view of a tread pattern showing an embodiment of a pneumatic radial tire for heavy load according to the present invention.

In FIG. 1, reference number 1 represents a tread surface, 2 represents a lug groove formed in a side region of the tread surface 1 to extend in a width direction of the tread and open at a side edge of the tread surface 1, and 3 represents a land portion defined between respective lug grooves 2.

As shown in FIG. 1, plural lug grooves 2 are provided in respective side regions of the tread surface 1 so as to extend in the width direction of the tread and terminate at the center region of the tread surface 1, such that respective land portions 3 each defined between the two adjacent lug grooves 2 are integral with each other forming a rib-shaped portion continuous in a circumferential direction at the center region of the tread surface.

Figure 2:
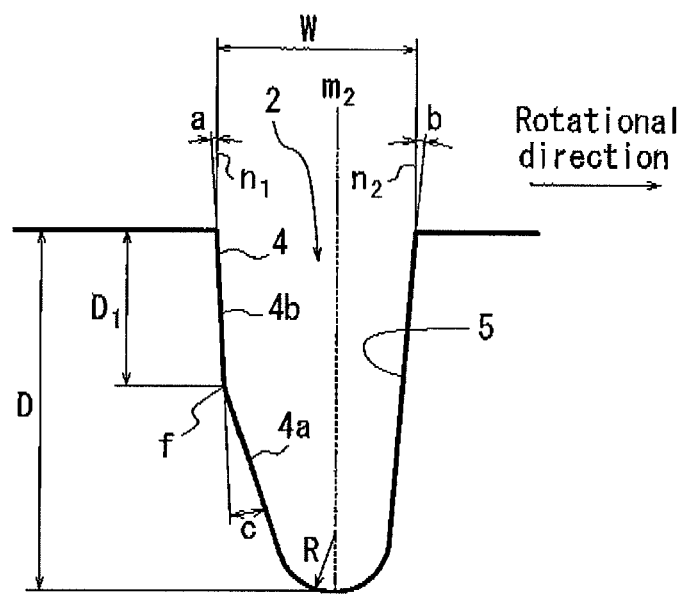
FIG. 2 is a partial sectional view along line S-S in the tread pattern shown in FIG. 1.

In the present embodiment, the lug groove 2 configured as shown in a lateral cross section view of FIG. 2 may have, for example, an opening width W at the tread surface 1 in the range of 20 to 80 mm, a depth D thereof in the range of 40 to 120 mm, and an extending length from the corresponding side edge of the tread surface 1 in the range of 80 to 350 mm.

With the tread pattern as shown in FIG. 1, the rib-shaped portion at the center region of the tread surface is always in contact with a road surface when the tire is rotated with load applied thereon, whereby driving stability is improved and generation of vibration of the tire when the tire is rotated on a paved road surface can be advantageously suppressed.

Additionally, in the radial tire of the present embodiment, only a groove wall 4 on the step-in side of one land portion 3 demarcated by a lug groove 2 is bent at at least one point or position (only one point in FIG. 2) in a depth direction of the lug groove 2 and a portion 4a located on the inner side in the radial direction than the bent point f is tilted in a direction that narrows the groove width, as shown in a lateral cross section of the lug groove 2 of FIG. 2, which lateral cross section is a partial sectional view cut along the S-S line in FIG. 1.

In the present embodiment, it is more preferable that: the bent point f is positioned within the range of 30-70% of a groove depth D of the lug groove 2 measured from a surface of the land portion; a portion 4b located on the outer side in the radial direction than the bent point f is tilted at an angle "a" with respect to a line $n_1$ normal to the surface of the land portion, which angle "a" falls in the range of 0-20°; a portion 4a located on the inner side in the radial direction than the bent point f is tilted at an angle "c" with respect to an imaginary line extended from the radially-outer-side portion 4b, which angle "c" falls in a range of 5-15°; and, a groove wall 5 of the kick-out side of each land portion is tilted such that an angle "b" formed by the groove wall 5 with respect to a line $n_2$ normal to the surface of the land portion satisfies a relationship of a−5°≤b≤a+5° (b≥0°).

By setting a depth $D_1$ of the bent portion f measured from the surface of the land portion in a range of 30-70% of the groove depth D of the lug groove 2, partial wear of the trailing edge of the land portion can be appropriately suppressed.

Specifically, in a case where the depth $D_1$ is less than 30%, the groove width of a groove bottom R of the lug groove 2 is too narrow, which is likely to result in generation of cracks at the groove bottom R. In a case where the depth D1 exceeds 70%, the deformation of the leading edge of the land portion is too small, which may result in failure to reduce pressing force I at a belt section as desired.

By tilting the portion 4a located on the inner side in the radial direction than the bent point f such that an angle "c" formed by the portion 4a with respect to an imaginary line extended from the radially-outer-side portion 4b is in the range of 5-15°, partial wear of the trailing edge of the land portion can be suppressed.

Specifically, in a case where the angle c is less than 5°, the deformation of the leading edge of the land portion is too small to obtain a sufficient effect of suppressing partial wear. In a case where the angle c exceeds 15°, the groove width of the groove bottom R of the lug groove 2 is too narrow, possibly facilitating generation of cracks at the groove bottom R.

By positioning the bent point f within the range of 30-70% of a groove depth D of the lug groove 2 measured from a surface of the land portion; tilting a portion 4b located on the outer side in the radial direction than the bent point f at an angle "a" with respect to a line $n_1$ normal to the surface of the land portion such that the angle "a" falls in the range of 0-20°; tilting a portion 4a located on the inner side in the radial direction than the bent point f at an angle "c" with respect to an imaginary line extended from the radially-outer-side portion 4b such that the angle "c" falls in a range of 5-15°; and tilting a groove wall 5 of the kick-out side of each land portion such that an angle "b" formed by the groove wall 5 with respect to a line $n_2$ normal to the surface of the land portion satisfies a relationship of a−5°≤b≤a+5° (b≥0°), it is possible to prevent deterioration of partial wear resistance caused by an increase in groove width of the lug groove 2 at the tread surface 1 and generation of cracks caused by a decrease in the width of the groove bottom R of the lug groove 2.

Figure 3:
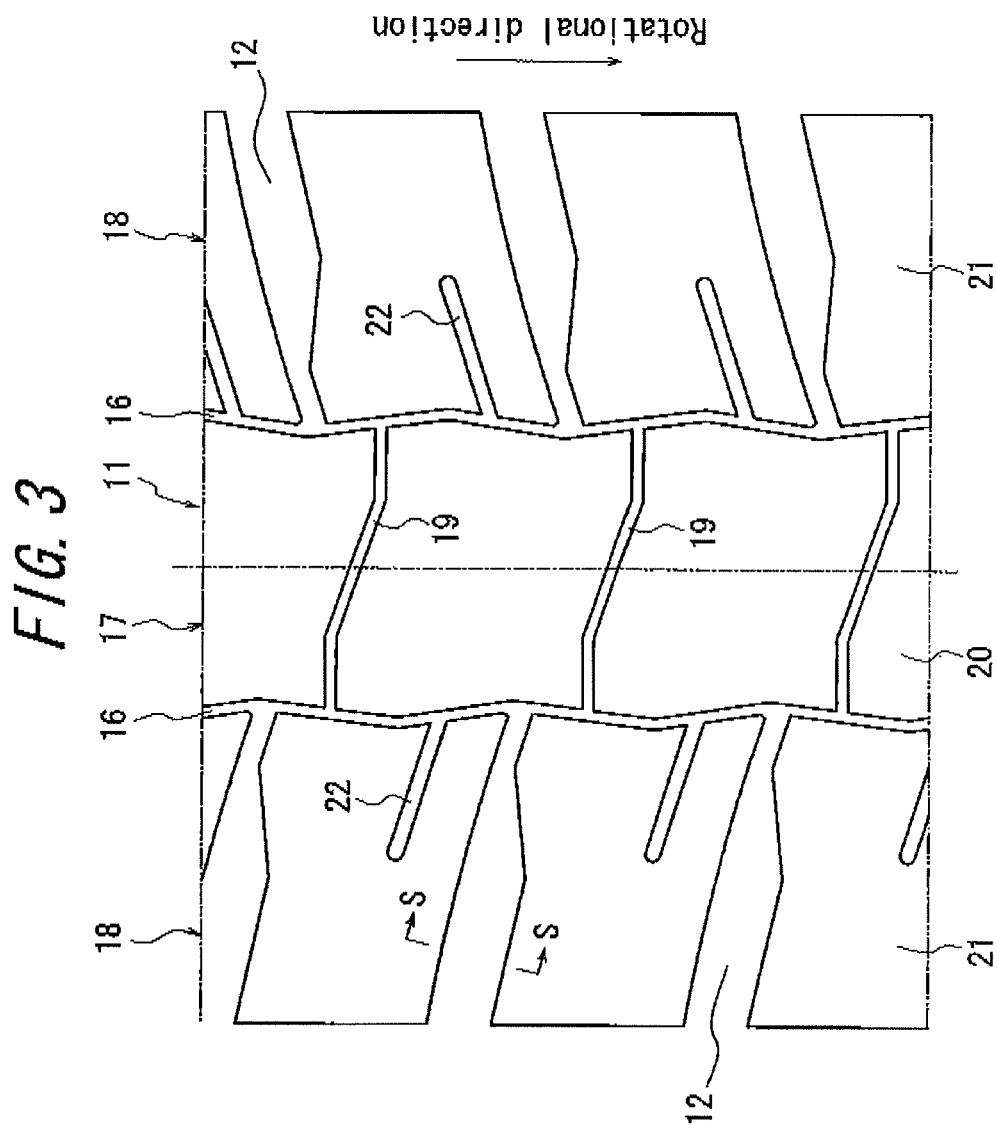
FIG. 3 is a partial development view of a tread pattern showing another embodiment of a pneumatic radial tire for a heavy load according to the present invention.
Figure 4:
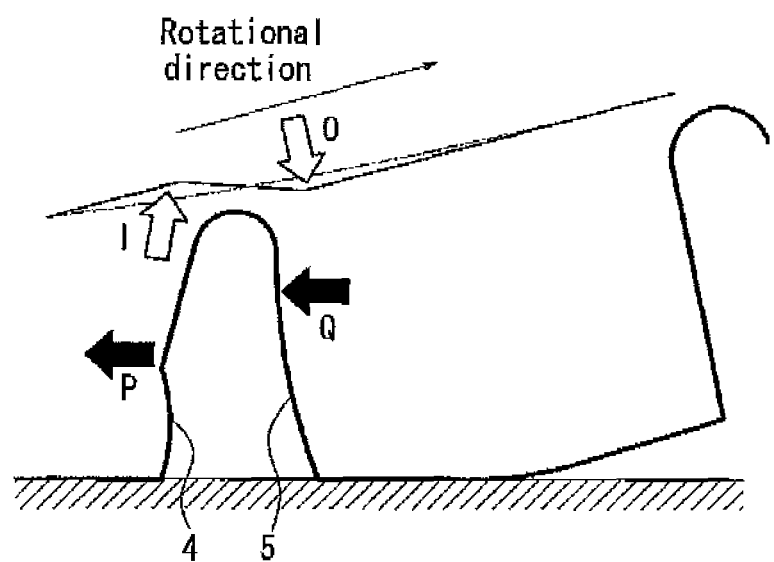
FIG. 4 is a lateral cross section of a lug groove during rotation of the pneumatic radial tire for heavy load according to the present invention; and, FIG. 5 is a lateral cross section of a lug groove during rotation of a conventional pneumatic radial tire for heavy load.
Figure 5:
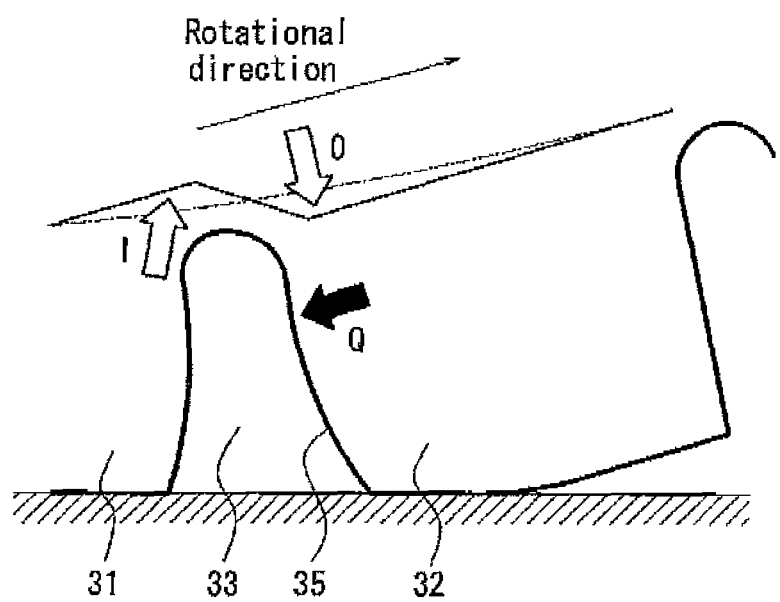

FIG. 3 is a partial development view of a tread pattern of another embodiment of the pneumatic radial tire for heavy load according to the invention. This tread pattern is different from the tread pattern shown in FIG. 1 mainly in that circumferential grooves and the like are provided in addition to the lug grooves to demarcate a land portion to blocks.

It should be noted that a lateral cross section structure along the line S-S of the lug groove of the present embodiment shares the same structure as shown in FIG. 2.

In the tread pattern shown in FIG. 3, a tread surface 11 is provided with two circumferential grooves 16 passing through respective ends, on the tread surface 11 inner side, of the respective lug grooves 12 and extending in a zigzag pattern. With this configuration, a central land portion 17 is defined between two adjacent circumferential grooves 16; a shoulder land portion 18 is defined between each of the circumferential grooves 16 and a side edge of the tread surface 11; and plural lateral grooves 19 crossing these circumferential grooves 16 are provided so as to be inclined rearward in the rotational direction, such that the central land portion 17 is demarcated into plural central blocks 20 and each of the shoulder land portion 18 is demarcated into shoulder blocks 21 by the grooves 12, 16 and the corresponding side edge of the tread surface 11.

The lug groove 12 is constituted of, from the side edge of the tread surface 11, a wide width portion having a constant groove width, a gradually-decreasing portion where a lug width gradually narrows toward the circumferential grooves 16, and a narrow width portion located at an innermost portion in the tread surface 11, and is extended and inclined such that portions thereof inclined forward in the tire rotational direction is first brought into contact with the ground surface during rotation of the tire.

Further, each shoulder block 21 is provided with a sub-groove 22 extending from the circumferential groove 16 on the outer side in the tread widthwise direction so as to be linearly inclined in the circumferential direction with respect to the lug groove 12 and terminate in the vicinity of the widthwise central portion of the shoulder block 21.

Here, the circumferential groove 16 may have a width of 5-20 mm and a depth of 20-80 mm; the lateral groove 19 may have a width of 5-20 mm, a depth of 20-80 mm, and a length of 250-450 mm; and the sub-groove 22 may have a width of 5-20 mm, a depth of 20-80 mm, and a length of 150-250 mm. The lug groove 12 may have a width W of 30-70 mm in the tread surface 11, a depth D of 40-120 mm, and a length of 80-350 mm measured from the corresponding side edge of the tread surface 11.

The tire having the tread pattern as described above can achieve good performances in driving stability, drainage properties, wear resistance, and partial wear resistance.

EXAMPLE 1

Radial tires with block patterns and size 46/90R57 having the structures as shown in FIG. 2 and FIG. 3, respectively, are prepared. An amount of slip of the trailing edge of the block is measured for each of Example tires 1 and 2 according to the present invention and Comparative Example tire, the characteristics of which tires are changed as shown in Table 1. Comparative Example tire is prepared basically in the same manner as Examples tires because the former requires no modification from the latter, except that a groove wall of a lug groove of the former should have the conventional structure.

TABLE 1

|  | Example tire 1 | Example tire 2 | Comparative Example tire |
|---|---|---|---|
| a (°) | 9 | 5 | 9 |
| b (°) | 9 | 5 | 9 |
| c (°) | 9 | 15 | 0 |

TABLE 1-continued

|  | Example tire 1 | Example tire 2 | Comparative Example tire |
|---|---|---|---|
| D (mm) | 97.1 | 97.1 | 97.1 |
| $D_1$ (mm) | 50 | 60 | — |

Each of Example tires 1 and 2 and Comparative Example tire is assembled with a rim of 1.45 (m)×0.74 (m) (57 (inch)× 29 (inch)) and inflated at an internal pressure of 700 kPa. Each tire is rotated with load mass of 62000 kg applied thereon, and an amount of slip of the kick-out side of each block in the tread surface when the block kicks-out is measured on a transparent plate by using a video camera. The results are shown in Table 2.

It should be noted that the figures in Table 2 are index values relative to the value of Comparative Example tire as the control. The smaller index value represents the better performance.

TABLE 2

|  | Example tire 1 | Example tire 2 | Comparative Example tire |
|---|---|---|---|
| Slip amount | 60 | 55 | 100 |

From the results in Table 2, it is known that Example tires 1 and 2 can significantly reduce an amount of slip of the trailing edge of the block, as compared with Comparative Example tire and, as a result, can effectively improve the uneven wear resistance.

The invention claimed is:

1. A pneumatic radial tire for heavy load, having a plurality of lug grooves provided in respective side regions of a tread surface to extend in the tread width direction, open at respective side edges of the tread surface, and define land portions therebetween, characterized in that:
   in a cross section of each lug groove in the width direction thereof, only a groove wall on the step-in side of each land portion is bent at at least one bent point in the depth direction of the corresponding lug groove such that a portion of the groove wall, located on the inner side in the radial direction than the bent point, is tilted in a direction that narrows a groove width, and an opening width W at the tread surface and a depth, of the lug groove, is in the range of 20 to 80 mm and in the range of 40 to 120 mm, respectively,
   wherein the bent point is positioned within the range of 30-70% of a groove depth of the lug groove measured from a surface of the land portion;
   a portion located on the outer side in the radial direction than the bent point is tilted at an angle "a" with respect to a line normal to the surface of the land portion, which angle "a" falls in the range of 0-20°;
   a portion located on the inner side in the radial direction than the bent point is tilted at an angle "c" with respect to an imaginary line extended from the radially-outer-side portion, which angle "c" falls in a range of 5-15°;
   a groove wall of the kick-out side of each land portion is tilted such that an angle "b" formed by the groove wall with respect to a line normal to the surface of the land portion satisfies a relationship of a−5°<b<a+5°(b≥0°); and
   wherein a portion of the groove wall on the step-in side, located on the inner side in the radial direction than the bent point and excluding a round groove bottom portion, is tilted at a constant angle "c" with respect to an imaginary line extended from the radially-outer-side portion of the groove wall, which angle "c" falls in a range of 5-15°.

* * * * *